United States Patent [19]

Marotel

[11] 4,216,371

[45] Aug. 5, 1980

[54] DEVICE FOR HEAT REGULATION OF AN ENCLOSURE PARTICULARLY FOR OSCILLATING PIEZOELECTRIC CRYSTAL, AND ENCLOSURE COMPRISING SUCH A DEVICE

[75] Inventor: Gérard Marotel, Sartrouville, France

[73] Assignee: Compagnie D'Electronique et de Piezoelectricite C.E.P.E., Sartrouville, France

[21] Appl. No.: 16,137

[22] Filed: Feb. 27, 1979

[30] Foreign Application Priority Data

Mar. 3, 1978 [FR] France .................... 78 06100

[51] Int. Cl.² ................................ H05B 1/02
[52] U.S. Cl. .................. 219/501; 219/210; 219/499
[58] Field of Search .......... 219/501, 494, 210, 209, 219/499, 485; 307/117

[56] References Cited

U.S. PATENT DOCUMENTS

| | | | |
|---|---|---|---|
| 2,932,714 | 4/1960 | Merrill | 219/501 |
| 3,028,473 | 4/1962 | Dyer et al. | 219/501 |
| 3,308,271 | 3/1967 | Hilbiber | 219/501 |
| 3,393,870 | 7/1968 | Jeffrey | 219/501 X |
| 3,395,265 | 7/1968 | Weir | 219/501 X |
| 3,450,863 | 6/1969 | Scholl | 219/501 |
| 3,585,364 | 6/1971 | Tadikonda | 219/501 |
| 3,816,702 | 6/1974 | Green | 219/209 |
| 3,831,003 | 8/1974 | Foesrter | 219/501 |
| 3,838,248 | 9/1974 | Uchida et al. | 219/501 |
| 3,866,587 | 2/1975 | Knapp | 219/501 |

*Primary Examiner*—B. A. Reynolds
*Assistant Examiner*—M. Paschall
*Attorney, Agent, or Firm*—Cushman, Darby & Cushman

[57] ABSTRACT

Temperature regulating apparatus for the control of temperature within an enclosure including a temperature measuring circuit which measures the temperature within the enclosure and a semiconductor heating circuit for generating heat responsive to the temperature measuring circuit. The temperature measuring circuit includes a resistive bridge with a temperature sensitive element as one of its legs, the output of the bridge being coupled to an amplifier for developing a temperature signal which varies as a function of the temperature within the enclosure. The heating circuit includes a plurality of transistors having their respective collector-emitter paths coupled in series so that a heating current can flow through the collector-emitter paths of all of the transistors. One of the transistors, designated the control transistor, has its base coupled to the output of the amplifier for controlling the heating current by the temperature signal. A current limiting circuit may be included in a feedback path around the control transistor.

11 Claims, 4 Drawing Figures

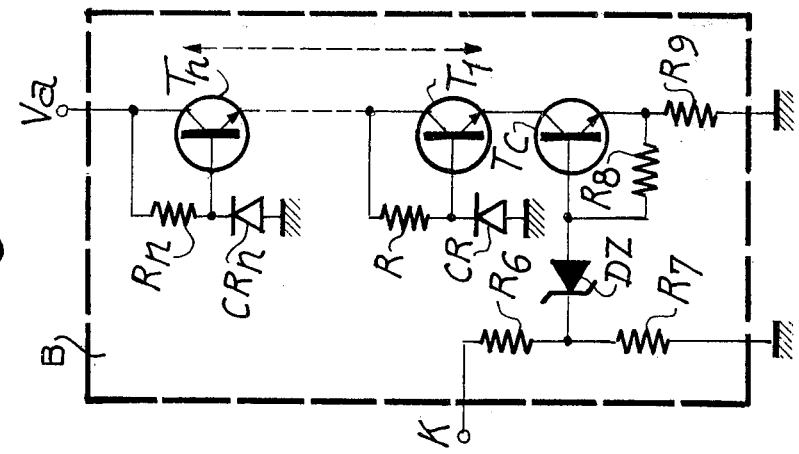
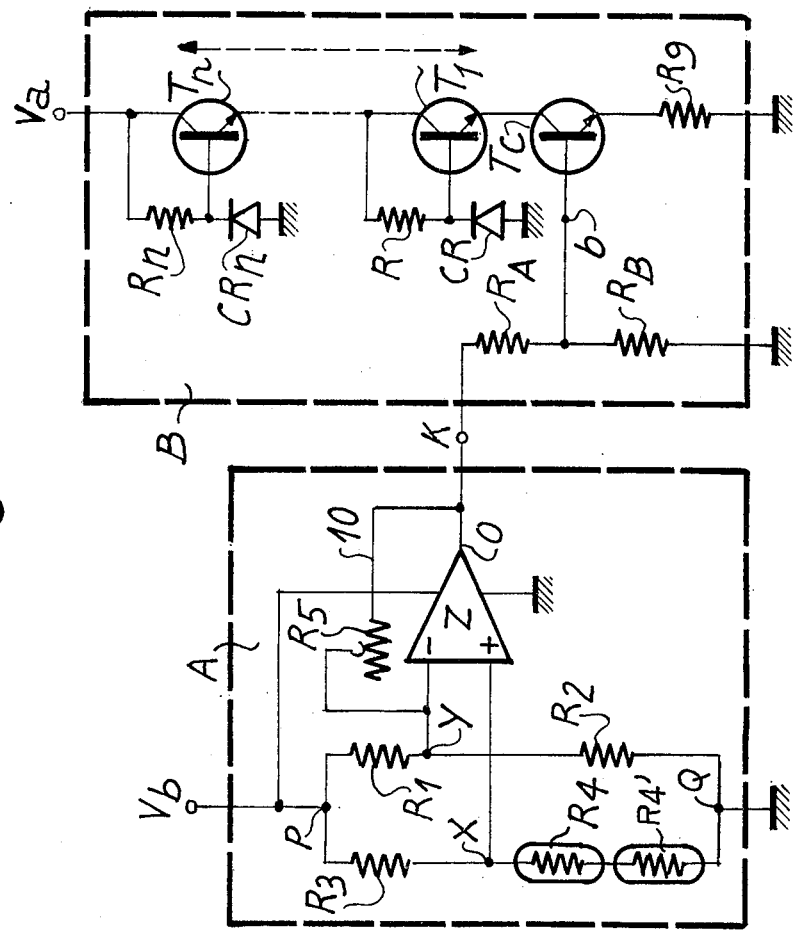

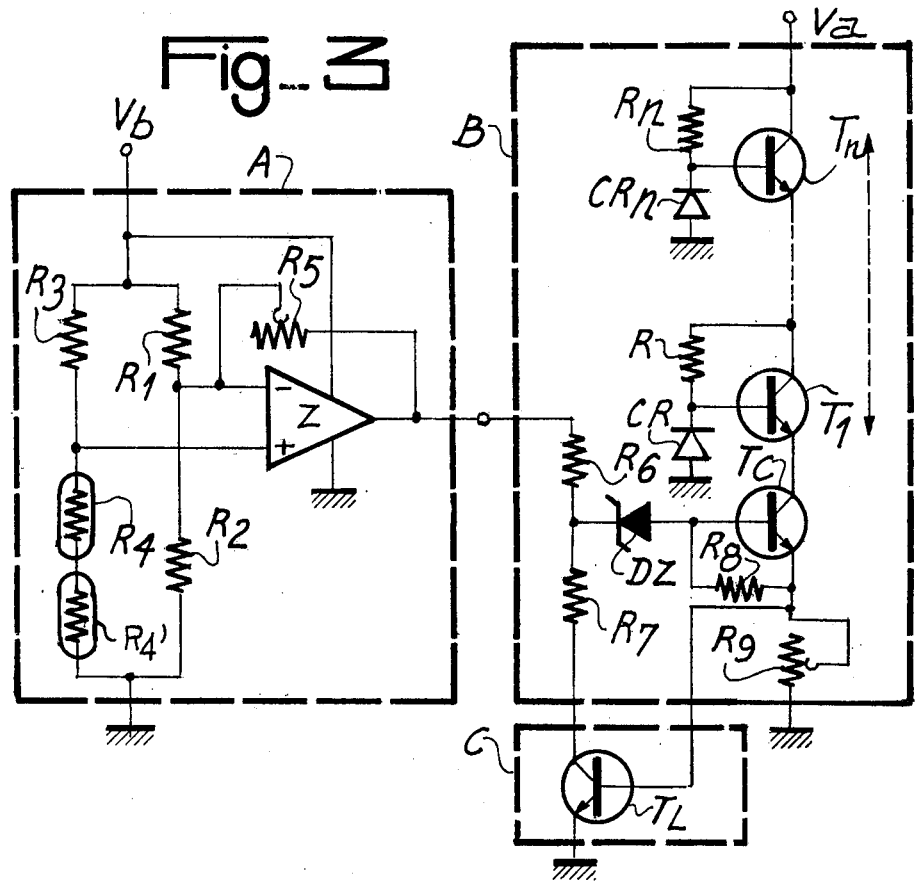
Fig_3
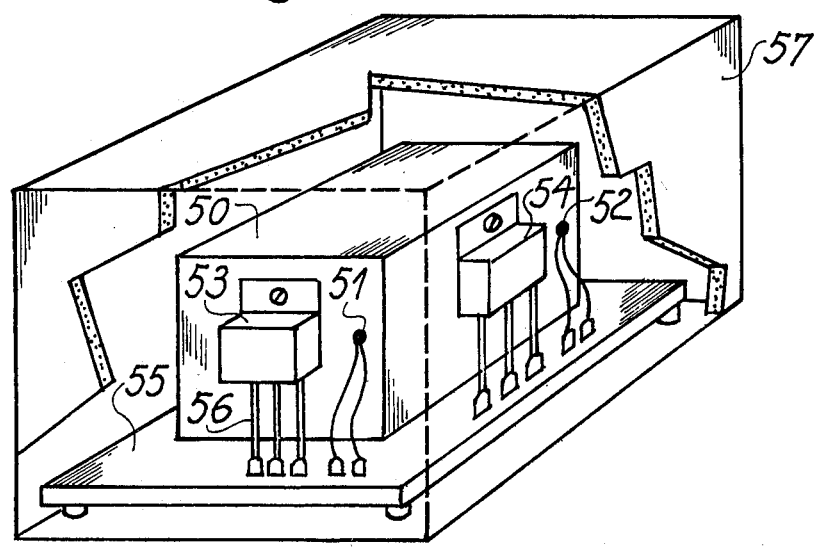
Fig_4

DEVICE FOR HEAT REGULATION OF AN ENCLOSURE PARTICULARLY FOR OSCILLATING PIEZOELECTRIC CRYSTAL, AND ENCLOSURE COMPRISING SUCH A DEVICE

BACKGROUND OF THE INVENTION

The present invention relates to temperature regulating devices and in particular to such devices utilized to control the temperature of the environment of an electronic circuit. More particularly, this invention relates to temperature regulating apparatus utilizing the heat developed by one or more semiconductor devices to control the temperature within an enclosure. With even greater specificity, this invention relates to temperature control for enclosures containing electronic devices or circuits having operating characteristics that are highly sensitive to temperature fluctuations.

Piezoelectric crystal electric oscillators, and other such devices and electronic circuits having operating characteristics that are highly sensitive to temperature are usually operated within an enclosure in which the temperature is regulated in order to isolate them from outside temperature fluctuations and their attendant effects.

In general, thermal regulating devices include three main parts:
- a heating source producing heat by the action of an electric current, such heat being applied to the body or enclosure to be heated;
- a temperature sensitive element for measuring the temperature of the body or temperature within the enclosure to be heated and for developing an electric control voltage related to that measured temperature; and
- a circuit responsive to the electric control voltage thus generated, for regulating the electric current within the heating source.

Conventional temperature regulating apparatus perform adequately and achieve satisfactory results only when the temperature range outside of the enclosure is not extreme. Devices currently available are not able to regulate within highly defined tolerances when the environment temperature fluctuates over a wide range. Such devices are not able to compensate effectively and rapidly for accidental, inadvertent or unintended temperature changes within the enclosure, or fail to induce a uniform heat distribution (heat homogeneity).

One known device utilizes a power transistor for heating coupled to an electrical power source between collector and emitter and includes a resistor in series with the emitter to avoid the heat burst phenomena by limiting the current through the power transistor. This arrangement results in poor heat homogeneity and requires a very small mechanical enclosure in order to obtain regulation on the order of tenths of degrees centigrade for an environmental temperature range of $-40°$ C. to $+70°$ C.

Another known device utilizes a plurality of transistors for heat generation, coupled in parallel to an electrical power source. These transistors are distributed on or about the enclosure to be temperature controlled. Each such paralleled transistor is separately controlled by a signal applied to its base. Although this arrangement provides better heat homogeneity, it is difficult to provide coordinated control of the base of each of the transistors. It is also difficult to match a plurality of paralleled transistors so that they will exhibit similar heating characteristics.

In addition, conventional temperature regulators are highly sensitive to power supply voltage fluctuations.

SUMMARY OF THE INVENTION

It is therefore an object of the present invention to provide a temperature regulating device for use under an extreme environmental temperature range.

Another object of the present invention is to provide a temperature regulating apparatus for controlling the temperature within an enclosure containing an electronic circuit or device.

A further object of the present invention is to provide an apparatus for temperature regulation within an electronic circuit or device enclosure for temperature regulation in an environmental temperature range of $-40°$ C. to $+70°$ C.

Still another object of the present invention is to provide a temperature regulating apparatus that is relatively insensitive to power supply voltage fluctuations.

Yet another object of the present invention is to provide a temperature regulating apparatus producing a relatively uniform heat distribution throughout the enclosure being temperature controlled.

A still further object of the present invention is provided a temperature regulator for a piezoelectric crystal oscillator enclosure maintaining sufficient temperature control to maintain oscillation frequency with a relative precision of $10^{-9}$ for an environmental temperature range of $-40°$ C. to $+70°$ C.

Another object of the present invention is to provide a temperature regulator suitable for use with large enclosures.

These and other objects of the present invention are accomplished by providing a temperature measuring circuit for developing a temperature signal which is a function of the enclosure temperature and is used as the control signal for a heating circuit. The temperature measuring circuit includes at least one temperature sensitive element as one leg of a resistive bridge that is balanced for a predetermined temperature. The output diagonal of the bridge is coupled to a variable gain amplifier the output of which is a temperature signal.

The heating circuit includes a plurality of heating transistors distributed about or within the enclosure to be temperature controlled and having their respective collector-emitter paths coupled in series with one another and coupled at one end to a power source. At the other end of the series, a control transistor completes the series back to the power source. The temperature signal is applied to the base element of this control transistor which in turn controls the current flowing in all heating transistors.

A current limiting transistor in a feedback loop around the control transistor allows the use of a small emitter resistor, avoiding excessive power loss.

A zener diode/resistive divider coupling arrangement of the temperature signal to the base element of the control transistor permits proper matching to and near linear response of the heating circuit.

BRIEF DESCRIPTION OF THE DRAWINGS

Many of the attendant advantages of the present invention will be readily apparent as the invention becomes better understood by reference to the following detailed description with the appended claims, when considered in conjunction with the accompanying drawings, wherein:

FIG. 1 is a schematic diagram of a heat regulating apparatus according to the present invention, including temperature measuring circuit A and heating circuit B.

FIG. 2 is a schematic diagram of a second embodiment of heating circuit B employing zener diode coupling.

FIG. 3 is a schematic diagram of the heating regulating apparatus according to the present invention including a third embodiment of heating circuit B employing a current limiting circuit.

FIG. 4 is a pictorial diagram of an enclosure including the heat regulating apparatus according to the present invention.

DESCRIPTION OF THE PREFERRED EMBODIMENT

Referring now to the drawings wherein like reference characters designated like or corresponding parts throughout the several views, FIG. 1 is a schematic diagram of the heat regulating apparatus according to the present invention. The heat regulating apparatus includes temperature measuring circuit A and heating circuit B.

Temperature measuring circuit A includes one or more heat sensitive elements $R_4$ coupled in series, which act as temperature pickups. Two temperature sensitive elements $R_4$ and $R_4'$ are shown incorporated in FIG. 2 into one leg of a resistive bridge having a power diagonal PQ and an output diagonal XY. The bridge can be a Wheatstone bridge or its functional equivalent and includes other resistive elements $R_1$, $R_2$, and $R_3$ as its remaining legs. Output diagonal XY is coupled to the inverting and noninverting inputs of a differential amplifier Z having an output O. A feedback path 10 coupling output O of differential amplifier Z to its inverting input includes a variable feedback resistor $R_5$, allowing the signal magnitude of the output at O of differential amplifier Z to be adjusted.

Temperature sensitive elements $R_4$ and $R_4'$ are positioned within and about the enclosure to be temperature regulated. The resistor values of $R_1$-$R_3$ are selected such that the bridge will balance and produce a null at output diagonal XY at only one temperature. When out of balance, a voltage appears at output diagonal XY and is coupled to differential amplifier Z which delivers at its output O a temperature signal which is a function of the enclosure temperature. This signal will be a null only for a particular value of temperature according to the value selected for $R_1$-$R_3$. In the particular circuit shown schematically in FIG. 1, $R_2$ is adjusted to predetermine the temperature balance point and then $R_5$ is used to adjust the overall magnitude of the temperature signal delivered by operational amplifier Z. The output of temperature measuring circuit A is designated K in the figures.

Heating circuit B includes a plurality of heating transistors $T_1$-$T_n$ having their collector-emitter paths coupled in series such that the collector of $T_1$ is coupled to the emitter of $T_2$ and the collector of $T_2$ is coupled to the emitter to $T_3$, etc. The collector of $T_n$ is coupled to a voltage source $V_a$ and the emitter of heating transistor $T_1$ is coupled to the collector of a control transistor $T_c$. The emitter of control transistor $T_c$ is coupled through a resistor $R_9$ to ground, and its base is biased by resistor $R_8$. By regulating current flowing through control transistor $T_c$, the current flowing through heating transistor $T_1$-$T_n$ is also regulated. In this way, transistors $T_1$-$T_n$ are coupled as voltage regulators. The base of each heating transistor $T_1$-$T_n$ is kept at constant potential by a diode-resistive divider including diode $CR_n$ and resistor $R_n$ coupling the collector of its respective heating transistor $T_n$ to ground. The base of each heating transistor $T_n$ is coupled to the junction formed by the cathode of diode $CR_n$ and resistor $R_n$. Alternate forms of voltage regulation for heating transistors $T_1$-$T_n$ are of course available and the invention as claimed herein id in no way limited to the particular circuit arrangement shown.

Control transistor $T_c$ regulates the current flowing through heating transistors $T_1$-$T_n$. Because of the voltage stabilization manner in which heating transistors $T_1$-$T_n$ operate, each of the n heating transistors has a voltage drop across its collector-emitter path equal to a fraction of the total voltage supply $V_a$ approximately $V_a/n$. The base b of control transistor $T_c$ is coupled to the output of the differential amplifier Z through a resistive divider including resistors $R_A$ and $R_B$ which allows for the matching of signal magnitudes and the establishing of linear operating ranges between temperature measuring circuit A and heating circuit B. Resistors $R_A$ and $R_B$ assure a proper match to the blocking voltage parameters of control transistor $T_c$. The use of a resistive divider having a suitable ratio makes it possible to reduce the output residual voltage of amplifier Z to its lowest level thereby bringing it to a value below the blocking voltage point of control transistor $T_c$.

Referring now to FIG. 2 which is a schematic diagram of a second embodiment of heating circuit B, a zener diode DZ couples the base of transistor $T_c$ to the resistive divider including resistors $R_6$ and $R_7$. The other elements perform the same functions as in the embodiment of FIG. 1. Without the use of a zener diode for coupling to transistor $T_c$, a portion of the gain of amplifier Z is lost through the resistive divider including $R_6$ and $R_7$. The resulting decrease in signal level would require the gain of amplifier Z to be increased thereby harming the sensitivity of the circuit to variations of temperature and supply voltage. The avalanche voltage of diode DZ is selected such that it has higher value than the output residual voltage of differential amplifier Z at its low level. The proper choice of avalanche voltage assures the complete blockage of the base of control transistor $T_c$ while allowing the free design choice of the gain of the amplifier Z.

Referring now to FIG. 3, a current limiting circuit C including transistor $T_L$ limits the maximum current flowing through heating transistor $T_1$-$T_n$. There are two conventional circuits utilized to limit current of a transistor. The first includes utilizing a large emitter resistance. Such a scheme has the inherent drawbacks of loss of sensitivity and a loss of power through the emitter resistance. The other commonly utilized circuit adjusts current flowing in the base of the transistor. This allows the emitter resistance to be kept at a more moderate value, but such an adjustment circuit also has inherent problems. It is difficult to obtain a well defined starting current in the entire temperature range to be regulated, the adjustment circuit is sensitive to variations of supply voltage, and the circuit is sensitive to deviations in heating transistor parameters.

The current limitation circuit C shown in FIG. 3 does not suffer from these deficiencies. The limiting circuit according to the present invention utilizes a current limited transistor $T_L$ driven at its base by a signal derived from the heating circuit to be limited and coupled at its collector to the base of control transistor $T_c$. The signal derived from the heating circuit is simply the voltage developed across emitter resistor $R_9$ in the emitter circuit of control transistor $T_c$.

There is significant advantage in utilizing the limiting transistor $T_L$ as shown in FIG. 3:

the value of resistor $R_9$ may be kept minimum thereby allowing maximum sensitivity and low losses;

starting current for control transistor $T_c$ is stable in the desired temperature range;

there is circuit stability even under conditions of fluctuating supply voltage; and the heating current level will be relatively insensitive to deviations of the parameters of the heating transistors.

Referring now to FIG. 4 there is shown a pictorial diagram of an electronic device or circuit enclosure including the heat regulating apparatus according to the present invention. The particular enclosure illustrated, by way of example, is for regulating the temperature of a piezoelectric crystal oscillator. The oscillator and temperature control circuits form a complete unit for integration into a more complex electronic system. The temperature regulating apparatus described above allows the building and manufacture of such an integrated unit functioning as a highly stable oscillator circuit for use under a wide range of environmental temperatures. Temperature pickups 51 and 52 analogous to $R_4$ and $R_4'$ of circuit A and heating transistors 53 and 54 analogous to $T_1$-$T_n$ of circuit B are coupled directly to a fluid tight enclosure 50 containing a piezoelectric crystal. Enclosure 50 is mounted directly on control circuit 55, which contains the remainder of circuits A and B or A, B and C thereby allowing mechanical support as well as the use of printed circuit techniques for the construction of control circuit 55. This mechanical arrangement allows connections 56 from control circuit 55 to heating transistor 53 to be short. Heat insulation between enclosure 50 and outside protective case 57 is assured either by an isothermal material or by a layer of air therebetween if the unit is hermetically sealed within enclosure 50.

The use of such an integrated unit as shown as a building block in more complex electronic systems is advantageous when compared with conventional temperature control oscillators which often include resistance wire for heat generation that must be wound on an auxiliary case around the enclosure to be heated. In addition, the electronic control circuits of conventional devices must often be included within the enclosure so as to benefit from the heat regulation of the enclosure and so as not to induce heat variation by their own operation.

The temperature regulating apparatus according to the present invention is able to regulate in an environmental temperature range of $-40°$ C.-$+70°$ C. while controlling the relative frequency variation $\Delta F/F$ of a piezoelectric crystal oscillator from $1.6 \times 10^{-8}$ to $1.0 \times 10^{-9}$, and for $+$ or $-10\%$ variation of supply voltage of the regulating device.

Therefore, it is apparent that there has been provided a temperature regulating apparatus for regulating an enclosed environment over a wide range of ambient temperature. The circuit and mechanical arrangement allows for the manufacture of a small self-contained temperature regulating oscillator that is relatively unaffected by moderate supply voltage changes while providing excellent temperature homogeneity within the enclosure.

Obviously, other embodiments and modifications of the present invention will readily come to those of ordinary skill in the art having the benefit of the teachings presented in the foregoing description and the drawings. It is, therefore, to be understood that this invention is not to be limited thereto and that such modifications and embodiments are intended to be included within the scope of the appended claims.

What is claimed and desired to be secured by Letters Patent of the United States is:

1. A temperature regulating apparatus for developing and maintaining a predetermined temperature level within an enclosure comprising:

temperature measuring circuit means for sensing the temperature within said enclosure and for generating a temperature signal related thereto; and heating circuit means coupled to said temperature measuring circuit means including a plurality of semiconductor heating circuit elements having their respective collector-emitter paths coupled in series, each of them constituting a means for providing a stable voltage drop across their respective collector-emitter paths, each stage producing the same amount of heat when a heating current passes therethrough, the amplitude of said heating current being responsive to said temperature signal.

2. The temperature regulating apparatus of claim 1 wherein said temperature measuring circuit means includes a resistive bridge including at least one temperature sensitive resistive element for generating a bridge signal related to the temperature within said enclosure.

3. The temperature regulating apparatus of claim 2 wherein said temperature measuring circuit means includes an amplifier coupled to the output of said resistive bridge and means connected to said amplifier for adjusting the magnitude of said bridge signal.

4. The temperature regulating apparatus of claim 1 wherein said heating circuit means includes a control transistor adapted for coupling said semiconductor heating circuit elements to a power source and for controlling the magnitude of said heating current, said temperature control signal being coupled to the base of said control transistor.

5. The temperature regulating apparatus of claim 4 wherein said heating circuit means further includes:

a resistive divider having an input coupled to the output of said temperature measuring circuit means and having an output; and a zener diode element coupling said output of said resistive divider to said base of said control transistor, thereby fixing the voltage at said base at a predetermined level.

6. The temperature regulating apparatus of claim 4 further wherein said heating circuit means further includes a resistive divider coupling the output of said temperature measuring circuit means to said base for lowering the residual voltage at the output of said temperature measuring circuit means to a magnitude below a predetermined blocking level of said control transistor.

7. The temperature regulating apparatus of claim 6 further including a zener diode element coupling said resistive divider to said base of said control transistor.

8. The temperature regulating apparatus of claim 4 further including current limiting circuit means for adjusting the voltage at said base of said control transistor and coupled in a feedback path around said control transistor element for generating a current limiting control signal responsive to said heating current.

9. The temperature regulating apparatus of claim 8 wherein said heating circuit means includes a resistive divider connecting the output of said temperature measuring circuit to the base of said control transistor and wherein said current limiting circuit means includes a transistor having a base coupled through a resistive divider to said control transistor.

10. A heat regulated device comprising:
an enclosure;
a temperature measuring circuit means for sensing the temperature within said enclosure and for generating a temperature signal relating thereto; and
heating circuit means coupled to said temperature measuring circuit means comprising a plurality of semiconductor heating circuit elements for producing heat when a heating current passes therethrough, the magnitude of said heating circuit being responsive to said temperature signal, said semiconductor heating circuit elements being distributed within or about said enclosure at a plurality of different locations.

11. A heat regulating device as in claim 10 further including a piezoelectric crystal oscillator within said enclosure.

* * * * *